May 4, 1954     D. O. PERRY     2,677,515
COMBINED LANDING GEAR OPERATING MECHANISM, SIDE
STRUT AND DOWN LOCK
Filed Dec. 21, 1951     2 Sheets-Sheet 1
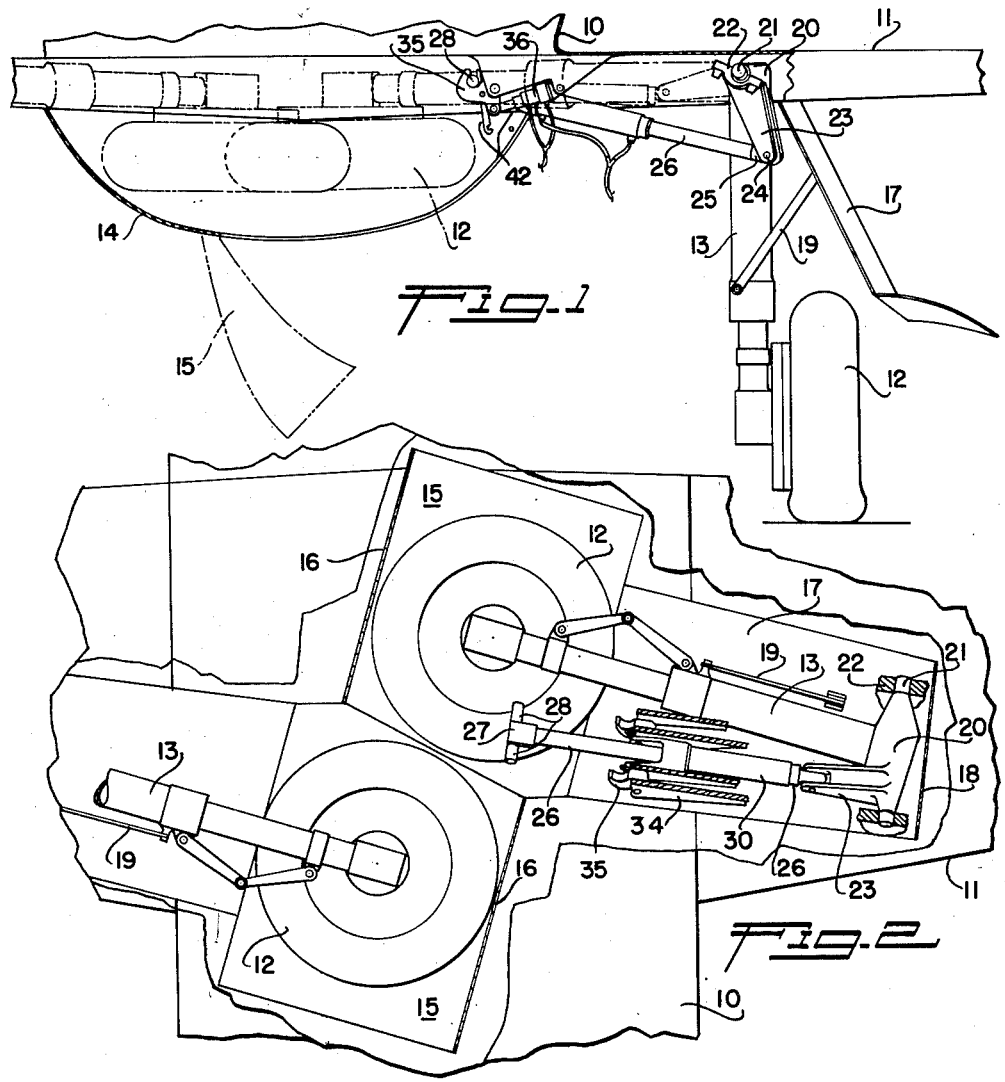
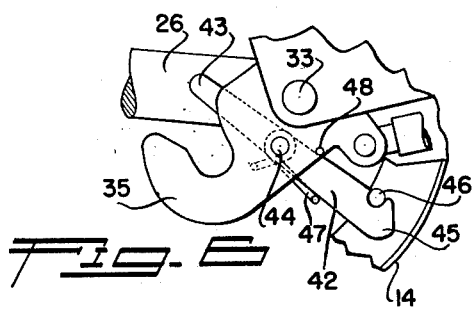
INVENTOR.
DONALD O. PERRY
BY
*George C. Sullivan*
Agent May 4, 1954 D. O. PERRY 2,677,515
COMBINED LANDING GEAR OPERATING MECHANISM, SIDE
STRUT AND DOWN LOCK
Filed Dec. 21, 1951 2 Sheets-Sheet 2
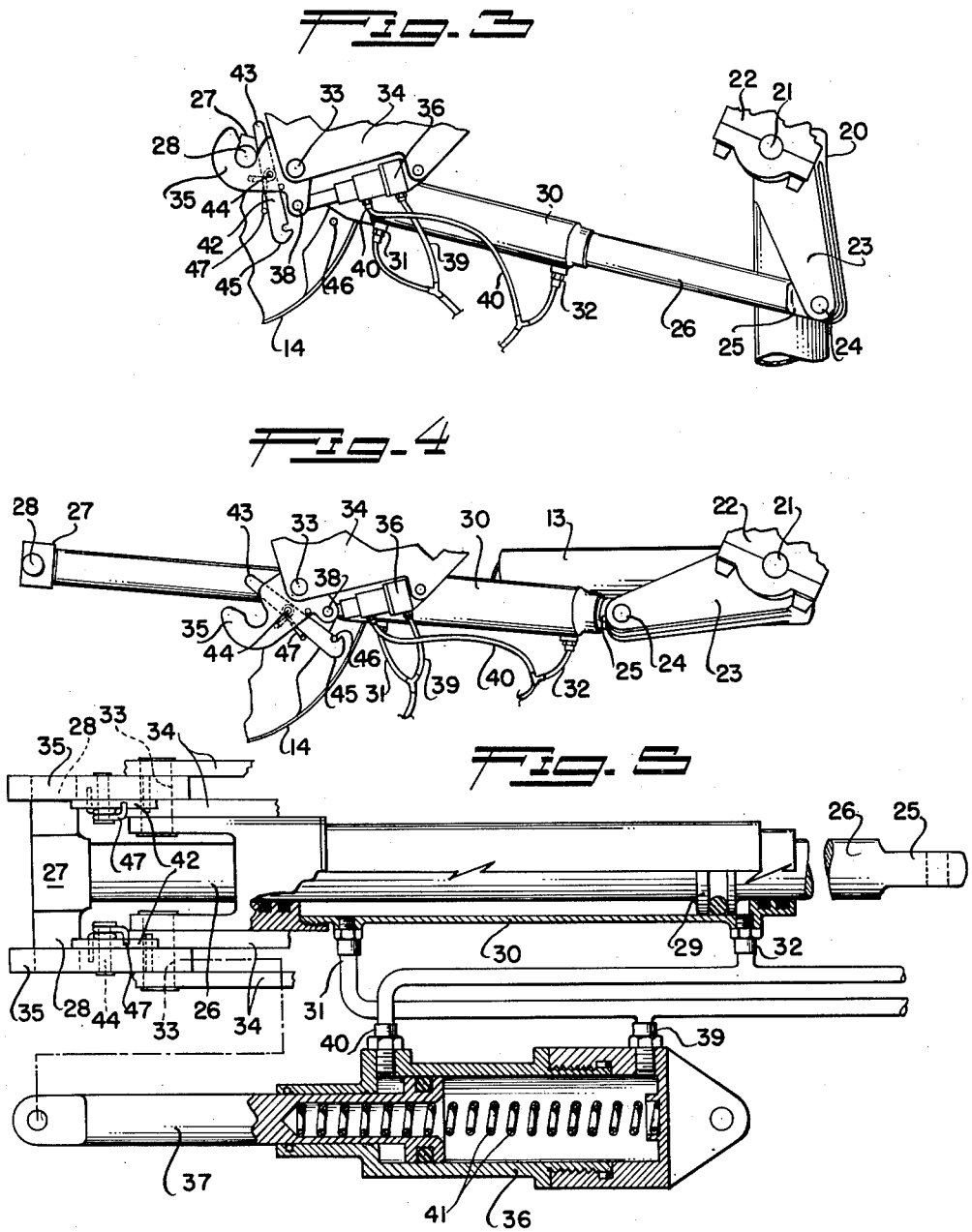
INVENTOR.
DONALD O. PERRY
BY
George A. Sullivan
Agent

Patented May 4, 1954

2,677,515

UNITED STATES PATENT OFFICE 2,677,515

COMBINED LANDING GEAR OPERATING MECHANISM, SIDE STRUT AND DOWN LOCK

Donald O. Perry, Glendale, Calif., assignor to Lockheed Aircraft Corporation, Burbank, Calif.

Application December 21, 1951, Serial No. 262,710

6 Claims. (Cl. 244—102)

This invention relates to retractable landing gear for aircraft and has special reference to an improved and simplified mechanism for the extension and retraction, and locking of such landing gears.

The continued increases in top speeds of airplanes have called for a parallel development of thinner wings therefor, which, particularly in fighter aircraft, do not have sufficient depth to house the wheel and shock strut unless the landing gear can be retracted within a suitably located powerplant nacelle, as is the practice with multiple powerplant aircraft. The present invention involves retraction of the wheel part of the gear into a pocket in the belly of the airplane, with the strut part of the gear housed within the outline of the thin wing; retracting and extending mechanism in its retracted position extending parallel to the strut to also fit within the confines of the thin wing.

It is, accordingly, an important object of this invention to provide an improved compact and simplified strut retracting and extending mechanism incorporating a down lock to brace and hold the landing gear in its extended position. While I have chosen to illustrate my invention as embodied in a side strut and brace for sidewise retraction of the landing gear, it may also be used for fore and aft retraction of the gear, in which case it would be termed a drag strut.

It is also an important object of this invention to provide an improved and simplified landing gear operating mechanism incorporating an automatically operated down lock energized simultaneously with and by the operating mechanism.

It is a further object of this invention to provide a down lock mechanism associated with and operated by the operating mechanism for extending the landing gear, the down lock having provisions for both mechanical and hydraulic engagement, which provisions automatically supplement and reinforce each other; and wherein the landing gear can be manually released, and fully extended by suitable manipulation of the airplane in flight.

It is also an object of this invention to provide a down lock of the character described wherein the proper engagement thereof can be visually checked when the airplane is on the ground.

Other and further objects and advantages of my invention will become apparent as the detail description of an embodiment thereof proceeds, as shown in the accompanying drawings wherein:

Figure 1 is a fragmentary cross section of a portion of an airplane fuselage and wing adjacent to the main landing gear location, one landing gear being shown in its extended position in full lines, and in its retracted position in dotted lines;

Figure 2 is a plan view corresponding to Figure 1 broken away to show the landing gears in their retracted positions;

Figure 3 is a detail of the landing gear side strut in its extended and locked position;

Figure 4 is similar to Figure 3 with the side strut in its retracted position;

Figure 5 is an enlarged schematic detail of the hydraulic operating and locking mechanism, corresponding to a plan view of Figure 3, only one lock cylinder being shown for clarity; and Figure 6 is an enlarged view of the down lock hook in its disengaged position.

As shown on the drawings, the embodiment chosen for illustration relates to a generally circular airplane fuselage 10, only the lower section of which is shown, having a thin wing 11 mounted low thereon, the wing being too thin to receive a retractable main landing gear wheel 12 and shock strut 13 within the confines thereof. By retracting the wheel portion of the gear into the belly 14 of the fuselage, it becomes possible to retract the upper portion of the shock strut 13 within the thin wing section, thus enabling complete enclosure of the complete landing gear and wheel with a fuselage door 15 hinged at 16, and a wing door 17, hinged at 18, the latter operated by a link 19 to the strut 13.

Since the chosen embodiment relates to an installation wherein the fuselage is too narrow to contain the wheels 12 of both main gears with the struts 13 in alignment with each other, the trunnion axes for the struts are set at small angles to the axis of the fuselage to enable the wheels to retract side by side in the fuselage belly, as best shown in Figure 2. The main wheels 12 and struts 13 on either side of the fuselage are completely interchangeable, so that details of one serve for both, the other being turned around or reversed, as also indicated in Figure 2.

The top of the shock strut 13 ends in a trunnion or yoke 20 which carries trunnion pivots 21, which turn in bearings 22 mounted in the wing structure. The yoke 20 also carries a crank or lever 23, with a bearing 24 at its outer end, to which is pivoted one end 25 of a combined side strut and gear retracting and extending rod 26. The other end of the rod 26 is provided with a yoke or head 27 carrying pins 28 which engage, in the extended position of the rod 26, with a down lock mechanism, to be later described. The rod 26 carries a piston 29 reciprocable in a double acting hydraulic cylinder 30 having hydraulic connections 31 and 32 at either end. When a conventional pilot's operating mechanism (not shown) supplies hydraulic pressure to the connection 31 to the cylinder 30, piston 29 and rod 26 are moved to the right into the position shown in Figure 5 wherein the landing gear is extended. The cylinder 30 is pivoted on pins or trunnions 33 at its left end to pairs of brackets 34 on either side of the cylinder which brackets are attached to the fuselage and wing structure, as the pins 33 absorb both the hydraulic reactions during strut extension and retraction and the side strut loads imposed on the rod 26 by the down lock mechanism when the airplane is landing.

The down lock mechanism referred to above comprises a pair of hooks 35, each pivoted on the pins 33 between the brackets 34 on either side of the cylinder 30, the hooks being shaped to engage the pins 27 on the head of the rod 26 when the hooks 35 are swung up or clockwise about the pins 33 into the position of Figure 1. The hooks 35 are normally hydraulically operated by double acting hydraulic locking cylinders 36 the piston rods 37 of which are pivotally connected to an ear 38 on the hooks. For clarity, only one cylinder 36 is shown in Figure 5. The cylinder 36 has hydraulic connections 39 and 40 to the hydraulic lines 31 and 32 of the retracting and extending cylinder 30, the line 39 being joined to 31 so that the hook is simultaneously urged to locking position when the cylinder 30 is energized to extend the gear, and line 40 is joined to line 31 so that when the gear is to be retracted the hooks 35 are simultaneously operated to release the pins 27 on the rod 26. A spring 41 is mounted in the locking cylinder 36, as shown in the enlarged view thereof in Figure 5, to urge the piston to the left to hold the hooks engaged when the hydraulic pressure is relieved. Also, in the event of hydraulic system failure the landing gear up-lock (not shown) can be tripped and the gear allowed to fall, suitable maneuvering of the airplane producing sufficient air forces on the doors 15 to pull the rod 26 into the down lock to allow the spring 41 to actuate the same into locking position.

Since the operating cylinder 30 and the locking cylinder 36 are simultaneously energized, a mechanical trigger and hold back lever 42 is provided to prevent movement of the hooks 35 towards the locked position of Figure 3 until the rod pins 28 trip the upper end 43 of the lever 42 as they reach their fully extended position. The lever 42 is pivoted at 44 near its mid-point, to the hook 35, and a notch in the lower end 45 of the lever 42 engages in pin 46 on fixed structure to hold the hooks 35 in the open position of Figure 4 until the trigger lever is tripped. A torsion spring 47 on the pivot 44 urges the trigger lever towards engagement with the pin 46 and a pin 48 on the hook 35 prevents over travel of the lever 42 when not engaged with the pin 47. The geometry of the hook pivot on the pins 33, relative to the ear 38 and the pivot 44 of the trigger 42 causes the pressure of the spring 41 in the lock cylinder 36 to impose a force axially of the trigger lever 42 tending to hold it tight on its pin 46, and thereby to hold the hooks 35 retracted when hydraulic pressure is applied to the lock cylinder 36 simultaneously with the start of the gear extending operation. As the rod 26 approaches to fully extended position the pins 28 release the trigger lever 42 from the pin 46, allowing the hooks 35 to swing up into the down lock position of Figure 3 in response to hydraulic pressure in the lock cylinder 36.

The operation of the gear operating mechanism is believed to be apparent from the foregoing description of the mechanism, but will be summarized herewith for convenience. Starting from the retracted position of the landing gear, details of the operating mechanism built around the rod 26, are shown in Figures 4 and 5; it will be noted that the rod forms a side strut for the extended gear. Pilot operation of a suitable hydraulic valve releases door and gear uplocks (not shown) and applies hydraulic pressure through the line 31 (Figure 5) to apply pressure to the left side of the piston 29 in the hydraulic cylinder 30 and simultaneously to the line 39 on the right end of the piston in the lock cylinder 36. The latter is held inoperative by the trigger lever 42 until the latter is tripped by the movement of the rod 26 and its pins 28 into the full down position, whereupon the hooks 35 are moved clockwise into locking engagement with the pins 28 as shown in Figures 3 and 5. With the gear extended and locked the trigger 42 serves as a ground indicator of the proper engagement of the down lock. To retract the strut hydraulic pressure is simultaneously applied through the lines 32 and 40, the latter serving to release the down lock hooks 35 from the pins 28; and the former then moving the rod 26 to the left into the retracted position of Figure 4. When the hook 35 is released at the start of the retraction movement, the lower end 45 of the trigger lever slides over and engages the pin 46 to hold the trigger lever in cocked position.

It will thus be seen that I have invented an improved and simplified landing gear operating mechanism incorporating a side strut and down lock wherein hydraulic extension and retracting mechanism is built into the side strut and is energized simultaneously with the down lock, with the mechanical timing of the sequential operation of the two. This arrangement conserves space and permits stowage of the shock strut and operating mechanisms within the wing section of very thin wings; greatly decreases the number of parts and complication of the entire mechanism, and provides for visual checking of down lock engagement when the gear is extended.

Having described only a typical form of the invention I do not wish to be limited to the specific details herein set forth, but wish to reserve to myself any variations or modifications that may appear to those skilled in the art and fall within the scope of the following claims.

I claim as my invention:

1. A retractable landing gear for an airplane including a wheel carrying shock strut, means pivotally connecting said shock strut to the wing of said airplane for sidewise movement between a retracted position wherein the shock strut is housed in the wing profile with the wheel housed in the body of the airplane and a depending extended position, a side strut member pivoted at one end to the shock strut, a hydraulic cylinder coaxial with said side strut member and pivoted at its inner end to airplane structure, a piston carried by said side strut member and operatable within said hydraulic cylinder to extend and retract said side strut member to thereby extend and retract said shock strut, a down lock mechanism pivoted on said hydraulic cylinder pivot, pin means carried by the side strut member engageable by said down lock mechanism when said member is in its fully extended position, and means to restrain said down lock mechanism from operation until the pin means on said member is in position to be engaged by said down lock mechanism.

2. A retractable landing gear as in claim 1 wherein the means to restrain the down lock mechanism comprises a trigger mechanism tripped by the movement of the side strut member into its fully extended position.

3. A retractable landing gear for an airplane including a wheel carrying stock strut, means pivotally connecting said shock strut to the airplane for movement between a retracted position and an extended position, an operating strut pivoted at one end to said shock strut and having pins to engage a down lock at the other end, a hydraulic operating cylinder coaxial with said operating strut intermediate the length thereof, a piston on said operating strut for operation in said operating cylinder, said operating cylinder having a pivotal connection to said airplane at one end thereof, and a down lock mechanism also pivoted on the operating cylinder pivotal connection, and arranged to engage the pins on the end of the operating strut when the shock strut is fully extended.

4. A retractable landing gear as in claim 3 wherein the down lock mechanism includes a hydraulic cylinder energized by fluid supplied to the strut operating cylinder, and trigger means restraining said down lock from operation until the shock strut is fully extended.

5. A retractable landing gear as in claim 3 wherein the down lock mechanism comprises a hook engaging the pins on the end of said operating strut in its extended position, said hook being pivoted on the operating cylinder pivotal connection, and means operated by said operating strut movement to its extended position to trip said hook for movement into its locked position when said operating strut approaches its fully extended position.

6. A down lock adopted for an operating strut of a retractable landing gear for an airplane including a wheel carrying shock strut pivoted to the airplane, the operating strut being a rigid member, a trunnion pivoted to the airplane in spaced relationship to the shock strut pivot thereto on which the operating strut is pivoted, said down lock comprising a hook being also pivoted on the trunnion pivot, means carried by the operating strut engageable by said hook in the extended position of the operating strut, and means for moving said hook into engagement with said last mentioned means upon extension of the operating strut.

References Cited in the file of this patent

UNITED STATES PATENTS

| Number | Name | Date |
|---|---|---|
| 2,049,066 | Kindelberger | July 28, 1936 |
| 2,403,835 | Villepigue | July 9, 1946 |
| 2,487,548 | Hawkins | Nov. 8, 1949 |

FOREIGN PATENTS

| Number | Country | Date |
|---|---|---|
| 1,001,446 | France | Oct. 24, 1951 |